United States Patent [19]

Oxley

[11] Patent Number: 4,712,364
[45] Date of Patent: Dec. 15, 1987

[54] QUICK ATTACHABLE AND DETACHABLE MOWER BLADE ASSEMBLY

[75] Inventor: Lonnie R. Oxley, West Bend, Wis.

[73] Assignee: Deere & Company, Moline, Ill.

[21] Appl. No.: 880,462

[22] Filed: Jun. 30, 1986

[51] Int. Cl.[4] ............................................. A01P 34/73
[52] U.S. Cl. ..................................... 56/295; 56/17.5; 30/349; 30/276
[58] Field of Search ................ 56/295, 17.5, 12.7, 56/13.6; 30/236, 260, 276, 347, 349, 339, 337, 335, 329

[56] References Cited

U.S. PATENT DOCUMENTS

| | | |
|---|---|---|
| 1,558,021 | 10/1925 | Libi ........................................ 30/339 |
| 3,243,944 | 4/1966 | Michaud . |
| 3,910,017 | 10/1975 | Thorud et al. . |
| 4,171,608 | 10/1979 | Hetrick . |
| 4,229,933 | 10/1980 | Bernard . |
| 4,586,257 | 6/1986 | Rittenhouse . |

OTHER PUBLICATIONS

U.S. application Ser. No. 589,143, filed Mar. 13, 1984 (Rittenhouse).

Primary Examiner—Robert Peshock
Assistant Examiner—John Weiss

[57] ABSTRACT

A quick attachable and detachable mower blade assembly comprising a blade member and blade holder member having flat adjoining surfaces and fixed to the lower end of a vertical drive shaft. A pair of studs are fixed to and project from one of the members through stud openings in the other of the members. The latter openings have an enlarged portion for passing the head of the studs and a narrow portion extending from the enlarged portion to an end conforming to the shape and dimension of the shank of the respective stud. The narrow portions of the openings are located and directed so that the studs, when seated in the respective ends, prevent axial and angular movement between the blade member and the blade holder member. The blade holder member and blade member have, in addition, a central opening which receives a downwardly biased pin extending from the lower end of the drive shaft. The pin will automatically sit in this latter opening upon the blade and holder members being positioned so that the studs are seated in the ends of their respective openings.

8 Claims, 6 Drawing Figures

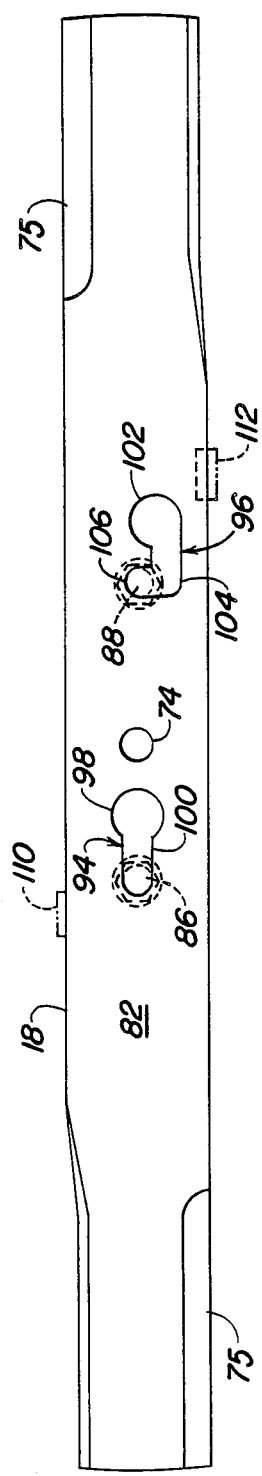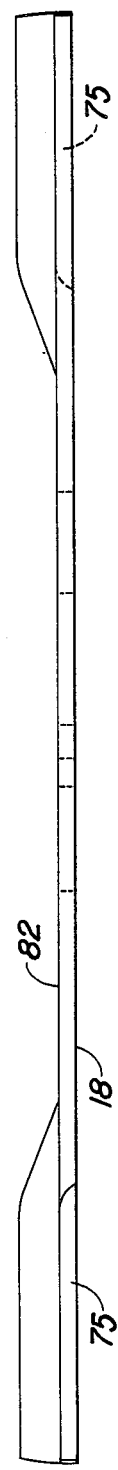

QUICK ATTACHABLE AND DETACHABLE MOWER BLADE ASSEMBLY

BACKGROUND OF THE INVENTION

When mowing grass on large acreages, such as golf courses, parks, large estates and commercial areas, it sometimes requires almost continuous mowing. Mower blades, under such conditions, continuously need to be sharpened. It is desirable that the blades be removed from the mowers for such sharpening and that consequently, a simplified means of detaching and attaching the mower blade to its drive shaft is desirable.

One of the factors that makes a simplified structure for such a purpose difficult to design is a safety factor. Since a blade rotates at a relatively high speed, it is necessary that the means of attaching the blade be completely reliable in order to prevent accidents or damage to property. Also, the nature of a lawn mower is such that stones and other foreign matter are often contacted by the mower blade which tends to scour or damage connecting elements holding the blade on the shaft. Often, such damage to the connecting elements will create a hardship in removing that blade for sharpening purposes.

There have been many attempts to install a quick attachable and detachable blade system on lawn mowers. Most of these rely upon removing and replacing only the outer cutting blade portion of the mower blades. One of the problems with such a system is that the blade attachments tend to break off at their connection. The high rate of rotation of the motor itself causes these blade portions to be thrown, and should they find their way out from under the mower housing, they can do considerable damage and injury to people and property.

Another method of providing a quick attachable and detachable mower blade assembly is by use of a unique arrangement of blade holder and blade developed and designed by Mr. James L. Rittenhouse and shown and described in his U.S. Pat. No. 4,586,257 which issued May 6, 1986. In this assembly, he provides a downwardly opening, U-shaped in cross-section blade holder. A blade is slidably received in the opening of the U-shaped holder. Upon the blade reaching a desired location with respect to the holder, an opening in the blade is positioned to receive a downwardly biased locking pin that holds the blade against further sliding action. Mr. Rittenhouse has provided notches in the leg portions of the U-shaped holder and notches in the opposite edges of the blade so that when properly aligned, the blade may be placed in the holder from beneath and then slid to its proper cutting position where the locking pin automatically inserts itself.

Some of the problems relating to Mr. Rittenhouse's design is that the notches in the edges of the blades and holder create stress areas that may cause premature failure of them. Should a stick, small stubble or other objects strike the pin and depress it momentarily while mowing, the blade could become unlocked and free to move radially, which could create a dangerous condition. Also, the only thing restricting the sliding movement of the blade relative to the holder is the single locking pin. Rupture of this pin would create a condition in which the blade was free to move or slide with respect to the holder. This could create a condition in which the mower blade could cause considerable damage to the mower deck or housing and could create a hazard to property and people working around the area of the mower.

SUMMARY OF THE INVENTION

With the above in mind, it is the primary purpose of the present invention to provide a mower blade assembly in which the blade may be easily attached and detached without, in most instances, the use of tools.

More specifically, it is the purpose of the present invention to provide a combination of a blade holding member and a blade member mounted on the lower end of a mower drive shaft so as to rotate with the shaft. The blade holder member has a pair of studs depending from its under surface downwardly through suitable openings in the blade. The studs have enlarged heads. A portion of each opening is large enough to permit a head to pass through and a portion of each opening is reduced to a narrow width which is substantially the diameter of the shank portion of the studs. One of the narrow portions is positioned and directed in the blade so that it will prevent relative radial movement between the holder and the blade and the other of the narrow openings is positioned so as to prevent relative angular movement between the holder and the blade. The ends of the narrow portions are rounded so that the shanks of the studs will rest along the rounded semi-circular edge of that end. A locking pin is provided in the main shaft and is biased downwardly to be received in an opening of the blade when the blade is properly positioned with respect to the holder. The locking pin serves the purpose of preventing any sliding movement between the blade and blade holder. However, should, for some reason, the locking pin be compressed while the blades are rotating, the relationship between the shanks and the direction of the narrow portions of the slots will resist axial and radial movement of the blade relative to its holder so as to prevent a hazardous condition. However, when the locking pin is compressed, the blade may be easily and manually moved to a location in which the enlarged portions of the openings are in position to pass the heads of the studs for removal of the blade.

It is a further purpose of the invention to provide lugs or tabs on the holder that engage the trailing edges of the blade and cooperate with and are so positioned with respect to the studs that extend through the blade that the blade cannot be mounted on the holder in other than the correct manner, i.e., the blade cannot be mounted upside down, with the cutting edge not being the leading edge with respect to the direction of rotation, or without the locking pin being seated in its locked position.

BRIEF DESCRIPTION OF THE DRAWINGS

FIG. 2 is a planned view of a lawn mower blade used in the blade assembly of the present invention with portions of the blade holder shown in dotted line.

FIG. 3 is a side view of the blade shown in FIG. 2.

DESCRIPTION OF THE INVENTION

Figure 1:
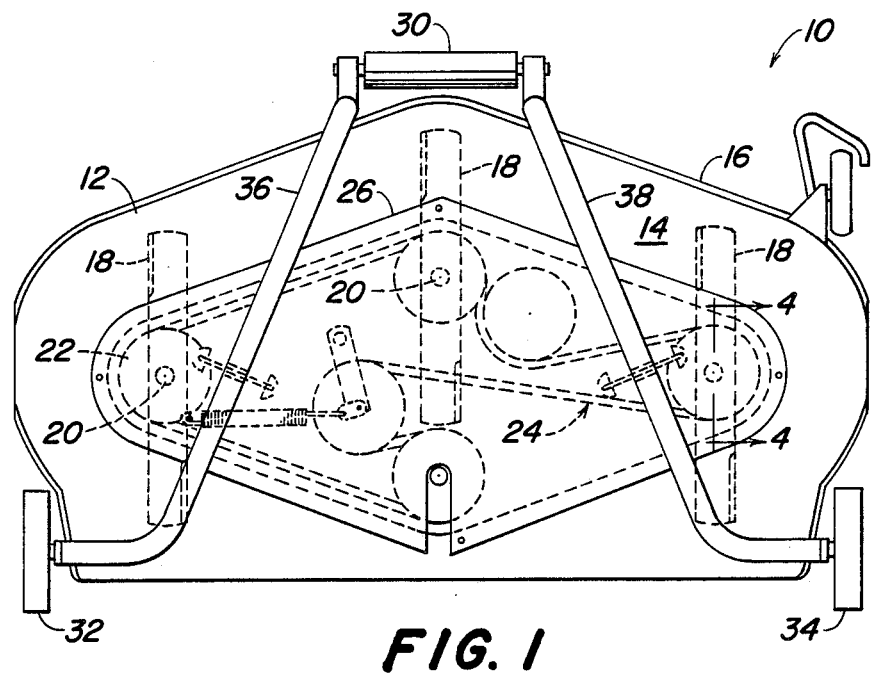
FIG. 1 is a top view of a lawn mower utilizing the blade mounting structure of the present invention.

Referring now to FIG. 1, there is shown a multiple spindle rotary mower 10 having a blade housing or deck 12 that has a top 14 and a depending skirt portion 16. The entire deck covers and supports three mower blades 18. The blades are carried on vertical shafts 20 having at their upper ends drive pulleys, which are driven through a belt drive indicated in its entirety by the reference numeral 24. The specifics of the belt drive are unimportant with respect to the present invention and other than to indicate that the shafts 20 and their respective pulleys 22 are driven by the belt drive, no further description thereof is believed necessary. The entire belt drive 24 is carried under a drive shield 26.

The mower 10 is of the underslung type, i.e., it is mounted on the underside of a tractor between its front and rear wheels. Provision for gauging the height of cut of the grass is provided through a front gauge roller 30 and a pair of rear gauge wheels 32, 34 which are connected to the rear ends of a pair of rearwardly converging structural members 36, 38, the forward ends of which are carried by the roller 30. Conventional means for adjusting the entire deck 12 with respect to the roller 30 and gauge wheels 32, 34, while not shown, are provided for the mower.

Figure 5:
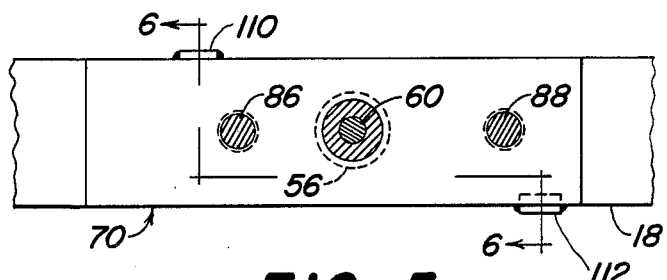
FIG. 5 is a plan view taken along the line 5—5 of FIG. 4 of the blade holder used in the assembly of the present invention.
Figure 4:
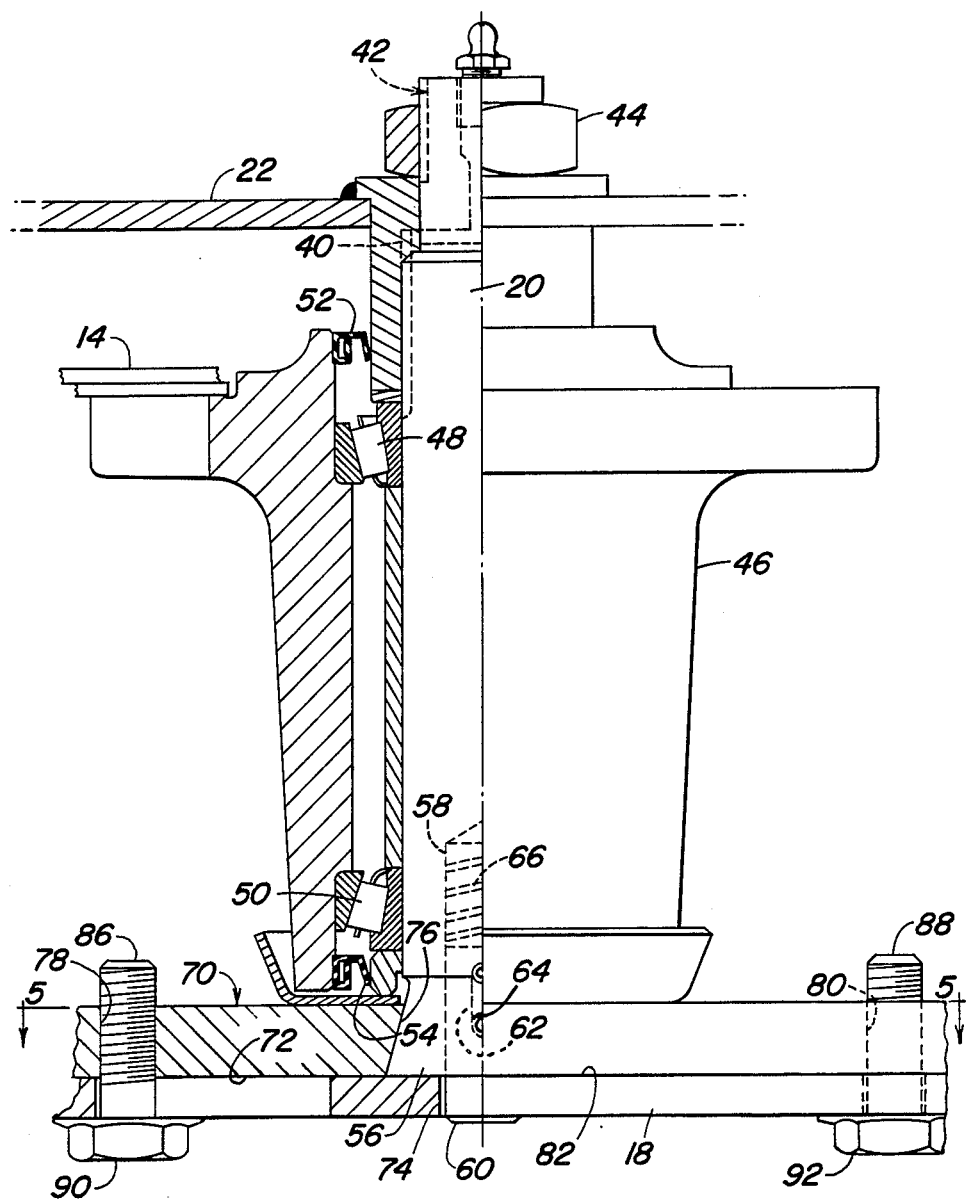
FIG. 4 is a side view of the assembled mower blade assembly as taken substantially along the line 4—4 of FIG. 1. For purposes of clarity in showing internal mechanisms and structure, part of the view is shown in section.

Referring now to FIG. 4, each blade 18 is provided with its main drive shaft 20 which has keyed at 40 thereto a drive pulley 22. The upper end of the shaft 20 is threaded as at 42 and has mounted thereon a conventional nut 44. The shaft 20 is carried in a journal structure 46 that is fixed to the underside of the mower deck 14 and depends downwardly therefrom. The journal 46 carries a pair of shaft bearings 48, 50, and upper and lower seals 52, 54. The lower end of the shaft 20 is provided with a frustoconical shaped end 56 that projects downwardly from the journal housing 46. The lower end portion of the shaft 20 also has a axially extending opening 58 which slidably receives a locking pin 60 projecting downwardly from the frustoconical end 56. The opening 58 has a pair of vertical slots 62 in its walls on diametrically opposite sides thereof. A pin guide 64 projects from opposite sides of the locking pin 60 and has its opposite ends resting in the slots 62. Thus, the locking pin 60 may move vertically the length of the slots 62. Above the locking pin 60 and in the upper end of the opening 58 is a compression spring 66 which biases or forces the pin 60 downwardly to its position as shown in FIG. 5. However, it should be understood that the pin 60 may be forced up into the opening 58 and to a point where it does not depend from the frustoconical end portion 56 of the shaft.

The blade assembly forming the basis of the present invention is composed of the blade member 18 of the type shown in FIGS. 2 and 3 and a blade holder member 70 of a type shown in FIG. 4. The blade 18 has a central opening 74 that, as will later become apparent, serves a purpose of receiving the lower end of the locking pin 60. At opposite ends and at opposite edges, there is provided a pair of cutting edges indicated at 75.

The blade holder member 70 is an elongated, flat plate member having a central frustoconical shaped opening that conforms to the frustoconical shaped end portion 56 of the main drive shaft 20. The holder member 70 is placed on the frustoconical end portion 56 and the nut 44 is turned to draw the end portion 56 in close and tight contact with the frustoconical surface 76 forming the frustoconical opening in the member. This tight fit results in the shaft 20, the blade member 18 and the blade holder member 70 rotating as a unit. The holder member 70 is provided with a pair of stud-receiving threaded openings 78, 80. The stud opening 78 on the left of the center opening 76, as viewed in FIG. 4, is offset a smaller distance from the axis of the opening 76 than the opposite opening 80 is offset to the right of opening 76. The purpose of this will later become apparent. The holder member 70 has a flat, lower surface 72 that, when assembled with the blade member 18, is alongside a flat upper surface 82 of the blade member 18, both surfaces being flat and adjoining one another permits the blade member 18, unless otherwise restricted, to slide relative to the holder member 70. It should be understood, however, that due to confinement within the skirt portion 16 of the mower deck 12 or due to interference with other blades or mower structure, each blade member is permitted only a small or limited amount of sliding action.

Threadedly received in the openings 78 and 80 are a pair of headed stud elements 86, 88. The headed stud elements 86, 88 are in the form of a common bolt having enlarged head portions 90, 92 spaced from the surface 72 substantially the thickness of the blade member 18. The shanks of the bolts 86, 88 are threaded and are, as is conventional, considerably smaller than the heads 90, 92. The threaded connection between the bolts 86, 88 and their respective threaded openings are self-locking thereby retaining the spacing between head portions 90, 92 and surface 72 at the desired distance. The studs 86, 88 depend from the surface 72 and extend through openings indicated in their entireties at 94, 96 offset to opposite sides of the center portion of the blade 18. The opening 94 has an enlarged portion 98 that permits passage of the head of its respective stud 86. The opening 94 also includes a narrow portion 100 extending from the enlarged opening 98 to an end offset radially outwardly from the opening 98. The narrow portion 100 of the opening 94 is substantially the same size as the diameter of the shank portion of the stud 86. Thus, unless restricted, the stud may penetrate through the enlarged opening portion 98 and the blade may then be slid until the shank portion of the stud is moved outwardly into the narrow portion so that the blade is held by the head 90 of the stud.

Referring to the right side of the blade member 18, the opening 96 is provided with an enlarged portion 102 that permits passage of the head 92 of the stud 88. The opening 98 also has a narrow portion 104 leading from the enlarged portion 102. The portion 104 is L-shaped, terminating at an end 106. The narrow portion 104 of the opening is also substantially the diameter of the stud 88. When the shank of the stud 88 is positioned in the end 106, the stud 88 will prevent relative axial movement between the blade and the blade holder. Again, the stud 88 may pass through the enlarged portion 102 of the opening 96 and the blade may then be slid along the narrow portion 104 of the opening 96 until it rests in the end 106. The position of the studs with respect to openings 94, 96 and when the blade is attached for mowing are best shown in phantom in FIG. 2.

Referring now to the operation of mounting and dismounting the blade from the blade holder, the blade is positioned wherein the heads 90, 92 of the respective studs 86, 88 are moved through the enlarged portions 98, 102 of the openings 94, 96. The blade 18 is then shifted or slid along the undersurface 72 of the holder until the shank portions of the respective studs 86, 88 rests respectively in the end of the narrow portion 100 of the left-hand opening and in the end portion 106 of the narrow portion 104. At this time, the opening 74 will come in registry with the locking pin 60 which permits it to drop or spring into the opening 74 and to prevent any further sliding of the blade. In order to remove the blade, it is necessary to compress or raise the locking pin 60 until the blade 18 can be slid in a reverse direction for removal.

It should also be understood that the studs may be threadably adjusted to compensate for different thicknesses of blade. However, in most instances, the blades will be of the same thickness and adjustment of the studs will not be necessary.

Referring to FIG. 2, it will be noted that the quantity of material removed to form openings 96 is different. To balance the blades properly, the openings 94, 96 are radial offset radially different amounts with respect to opening 74. Studs 86 and 88 are also located in radially offset positions with respect to opening 74. By positioning the studs and openings in this manner, the rotating spindle assembly retains a balance to make it more efficiently operated.

Also, the locations and directions of the narrow portions of the openings 94, 96 serve a unique purpose. When the studs are positioned in the ends of the narrow portions, as shown in FIG. 2, the edges of the narrow portion 100 will rest against the shank of stud 86 thereby preventing relative angular movement between the blade and blade holder. Likewise, on the opposite side of opening 74, the shank of stud 88 will contact the end 106 of the narrow portion 104. Note that the edge forming the end 106 is on the same side of the stud 88 as the cutting edge 75 on that end of the blade. Thus, if the blade strikes a foreign object while rotating, the two studs 86, 88 will resist angular separation between the blade and blade holder. This substantially removes all load on the pin 60. Also important, should a stick, stubble or other foreign object temporarily compress the pin 60 while the mower is in operation, the studs 86, 88 will resist shifting of the blade both axially and radially with respect to the holder, thereby preventing a hazardous condition of an unlocked blade and holder. Also, the transverse disposition of the end portion of the narrow portion 104 with respect to the longitudinal dimension of the blade prevents radial shifting of the blade with respect to the holder, thus removing a radial load on pin 60.

Figure 6:
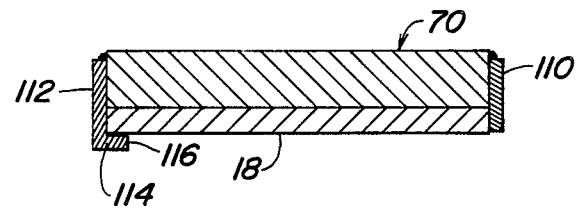
FIG. 6 is an enlarged sectional view taken along line 6—6 of FIG. 5.

Referring now to FIGS. 2, 5 and 6, the holder 70 has fixed to its opposite edges a pair of lugs 110, 112 that depend downwardly from the edges of the holder and are disposed alongside the trailing edges of the blade 18, trailing edges, for purposes of this description, being the edges that are opposite of the cutting edges 75. The lug element 112 is L-shaped and has a inwardly projecting leg portion 114 that underlies the trailing edge portion of the blade 18. Referring to FIG. 2, it will be noted that the distance between the trailing edge of the blade 18 and the center of the enlarged portion 102 of opening 96 is less than the transverse distance between the center of stud 88 and the leading or forward edge 116 of the leg portion 114. This becomes important for the reason that the blade can be positioned so that the openings 102, 98 may receive the heads of studs 86, 88 without interference between the blade and the L-shaped lug 112. Should the blade as shown in FIG. 2 be reversed, there would be interference with the leg portion 114 and the edge of the blade 18. Thus, the blade cannot be reversed or turned over without creating interference with the leg 114.

The lugs 110, 112 also serve other purposes. For example, should the blade cutting edges 76 contact an embedded object which would tend to turn or twist a blade about its longitudinal axis, the leg portion 114 will resist such action. Also, the lugs 110, 112 which engage the trailing edges of the blade 18 would tend to aid in driving the blade along with the studs 86, 8. This, of course, gives added strength to the entire blade assembly.

I claim:

1. A quick attach blade assembly for use on a grass cutting mower having a vertical rotatably driven main shaft with a lower end portion, said assembly comprising: a vertical locking pin supported in the lower end portion of said shaft by biasing structure that yieldably holds said pin in a lowermost position in which the lower end of the pin projects downwardly of the lower end portion of the shaft; a blade holder fixed to the lower end portion of said shaft, and projecting radially to opposite sides thereof, said holder having a lower blade-contacting surface and a central opening through which said pin projects; a pair of headed studs fixed to the holder and offset radially from and on opposite sides of the central opening, said studs having the heads spaced downwardly from said lower surface; a mower blade having opposite ends and a central pin-receiving opening, and said blade a pair of stud openings with each of the stud openings having an enlarged portion for passing the head of a respective stud and a narrow portion extending from the enlarged portion to an end conforming to the shape and dimension of the shanks of its respective stud, one of said narrow portions being located and directed so as to prevent radial movement in either direction between the holder and blade, and the other of said narrow portions being located and directed so as to prevent angular movement between the holder and blade.

2. A quick attach blade assembly for use on a grass cutting mower having a vertical rotatably driven main shaft with a lower end portion, said assembly comprising: a vertical locking pin supported in the lower end portion of said shaft by biasing structure that yieldably holds said pin in a lowermost position in which the lower end of the pin projects downwardly of the lower end portion of the shaft; a blade holder fixed to the lower end portion of said shaft, and projecting radially to opposite sides thereof, said holder having a lower blade-contacting surface and a central opening through which said pin projects; a pair of headed studs fixed to the holder and offset radially from and on opposite sides of the central opening, said studs having the heads spaced downwardly from said lower surface; a mower blade having a pair of stud openings with each of the stud openings having an enlarged portion for passing the head of a respective stud and a narrow portion extending from the enlarged portion lengthwise of said blade to a respective end, one of said narrow portions having a part thereof adjacent its respective end extending transverse of said blade so as to resist radial movement of said blade in either radial direction when the respective stud is seated in said end part, said blade having a pin-receiving opening between said stud openings that is in registry with and receives said locking pin when said studs are adjacent said ends of said narrow portions.

3. The invention defined in claim 2 further characterized by a pair of lugs rigid with and depending from the blade holder on opposite radial sides of said central opening, and engaging the respective trailing edges of said blade.

4. A quick attach blade assembly for use on a grass cutting mower having a vertical rotatably driven main shaft with a lower end portion, said assembly comprising: a blade holder fixed to the lower end portion of said shaft, and projecting radially to opposite sides thereof, a pair of headed studs fixed to the holder and offset radially from and on opposite sides of the main shaft, each stud having its head spaced downwardly from a lower surface of said holder; a mower blade having a pair of stud openings with each of the stud openings having an enlarged portion for passing the heads of a respective stud and a narrow portion extending from the enlarged portion lengthwise of said blade to a respective end, one of said narrow portions having a part thereof adjacent its respective end extending transverse of said blade so as to resist radial movement of said blade in either radial direction when the respective stud is seated in said end part; a detachable locking element extending between the holder and blade preventing relative movement therebetween toward a position in which the stud heads are located in enlarged portions of said stud openings; lug elements rigid with and depending from the blade holder engaging said blade, with a portion of at least one lug element underlying said blade.

5. The invention defined in claim 4 further characterized by said lug that underlies the blade being L-shaped with a leg thereof extending horizontally and under the trailing edge portion of said blade.

6. A quick attach blade assembly for use on a grass cutting mower having a vertical rotatably driven main shaft with a lower end portion, said assembly comprising: a vertical locking pin supported in the lower end portion of said shaft by biasing structure that yieldably holds said pin in a lowermost position in which the lower end of the pin projects downwardly of the lower end portion of the shaft; a blade holder fixed to the lower end portion of said shaft, and projecting radially to opposite sides thereof, said holder having a lower blade-contacting surface and a central opening through which said pin projects; a pair of headed studs fixed to the holder and offset radially from and on opposite sides of the central opening, said studs having the heads spaced downwardly from said lower surface; a mower blade having a pair of stud openings with each of the stud openings having an enlarged portion for passing the head of a respective stud and a narrow portion extending from the enlarged portion lengthwise of said blade to a respective end, one of said narrow portions having a part thereof adjacent its respective end extending transverse of said blade so as to resist radial movement of said blade when the respective stud is seated in said end part, said blade having a pin-receiving opening between said stud openings that is in registry with and receives said locking pin when said studs are adjacent said ends of said narrow portions; and a pair of lugs rigid with and depending from the blade holder on opposite radial sides of said central opening, and engaging the respective trailing edges of said blade, one of said lugs being L-shaped with a leg thereof extending horizontally and under the edge portion of said blade and said enlarged portion of said stud opening at that end of the blade and holder is a smaller distance from the edge of the blade than the transverse distance between the transverse innermost edge of said leg and the stud whereby said enlarged portion will receive the stud head without interference between the blade and L-shaped stud.

7. The invention defined in claim 6 in which said studs are positioned different radial distances from the central opening of said blade holder.

8. A quick attach blade assembly for use on a grass cutting mower having a vertical rotatably driven main shaft with a lower end portion, said assembly comprising: a blade holder fixed to the lower end portion of said shaft and projecting radially to opposite sides thereof, a pair of headed studs fixed to the holder and offset radially from and on opposite sides of the main shaft, each stud having its head spaced downwardly from a lower surface of said holder; a mower blade having a pair of stud openings with each of the stud openings having an enlarged portion for passing the head of a respective stud and a narrow portion extending from the enlarged portion lengthwise of said blade to a respective end, one of said narrow portions having a part thereof adjacent its respective end extending transverse of said blade so as to resist radial movement of said blade when the respective stud is seated in said end part; a detachable locking element extending between the holder and blade preventing relative movement therebetween toward a position in which the stud heads are located in the enlarged portions of said stud openings; lug elements rigid with and depending from the blade holder engaging said blade, with at least one lug element being L-shaped with a leg thereof extending horizontally and under the trailing edge portion of said blade, and in which said enlarged portion of said adjacent stud opening is a smaller distance from said trailing edge of the blade than the transverse distance between the transverse innermost edge of the leg and the stud whereby said enlarged portion may receive the stud head without interference between the blade and L-shaped stud.

* * * * *